Jan. 5, 1932.  E. FETTER  1,840,027
METHOD OF AND APPARATUS FOR MAKING INNER TUBES
Filed Oct. 25, 1928
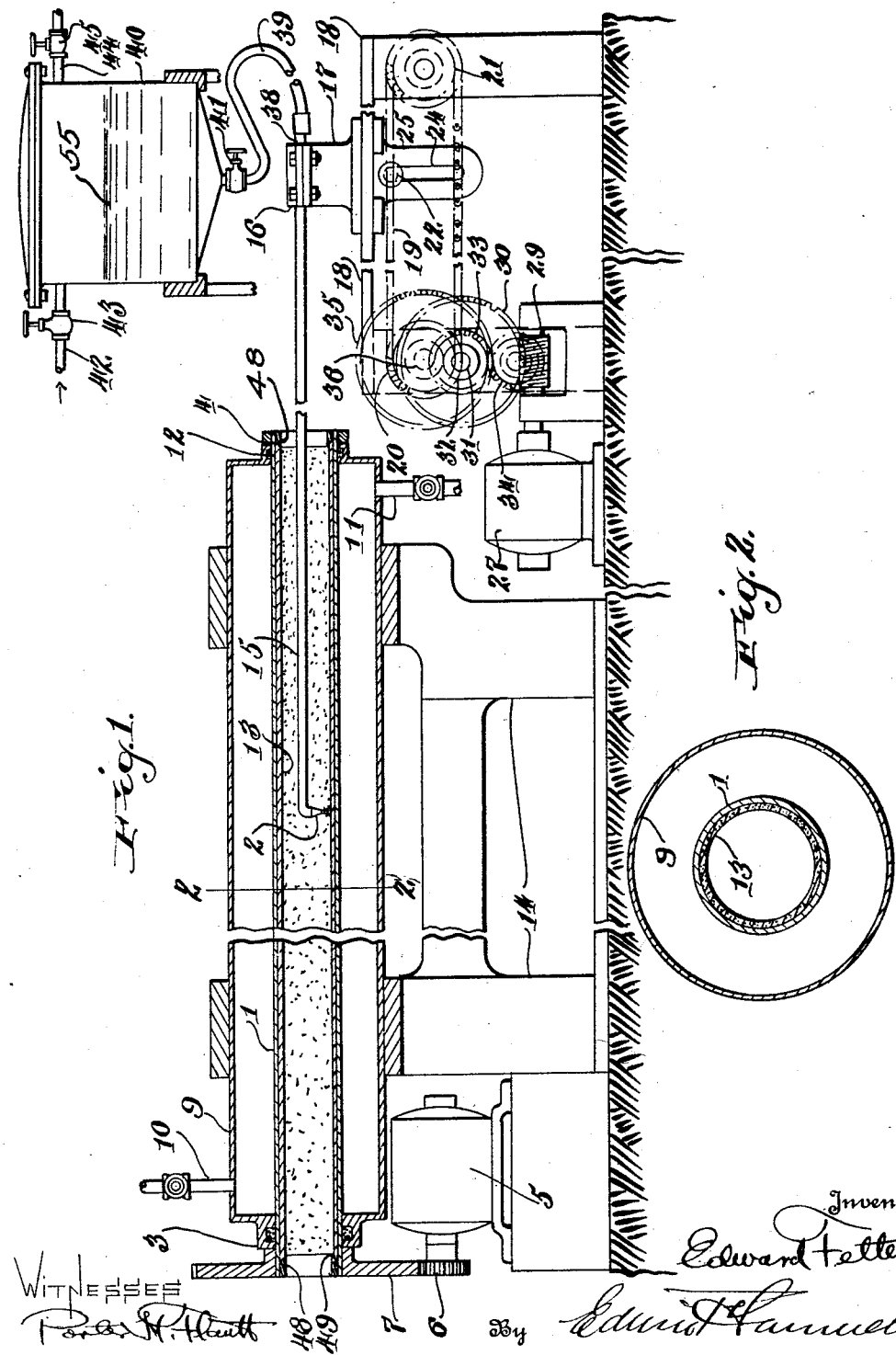

Patented Jan. 5, 1932

1,840,027

UNITED STATES PATENT OFFICE

EDWARD FETTER, OF BALTIMORE, MARYLAND

METHOD OF AND APPARATUS FOR MAKING INNER TUBES

Application filed October 25, 1928. Serial No. 315,003.

The invention relates to the manufacture of rubber tubing, particularly the tubing adapted for use in the manufacture of inner tubes for pneumatic tires, it being understood that the majority of such tubes are at present made of corresponding lengths of straight tubing, the ends of the tubing being brought together and spliced to produce the inner tube in the accepted annular form.

Until recently all or substantially all of such tubing has been made from a vulcanizable mixture or compound of rubber and other ingredients in the form of a solid which prior to vulcanizing is of an appearance somewhat resembling putty.

The present invention relates to the manufacture of tubing by the use of rubber or the equivalent in the form of a liquid vulcanizable compound instead of the solid putty-like compound just described. For this purpose a liquid known as latex to which has been added vulcanizing ingredients may be used, and for the purposes of the invention the compound may be vulcanizable either by heating or by the acid method, or otherwise, to produce the effect of vulcanized rubber.

The manufacture of tubes from liquid rubber, instead of from the solid vulcanizable compound, has the advantage that the tubes made from the latex contain the fiber of the rubber in much better condition to resist wear than do the tubes made from the solid compound, the rubber having in the latter instance been first solidified and then disintegrated in the production of the compound, apparently loses to a large degree, its wear-resisting properties.

Latex has been previously utilized in the manufacture of rubber tubing by dipping a mandrel in a vulcanizable mixture of latex, thereby coating the mandrel with latex. The rubber is then vulcanized on the mandrel and the tube thus formed removed by blowing in accordance with the present practice of removing tubes from mandrels and molds.

It will be understood that in this previous practice the liquid is made as of any desired consistency, and the dipping may be repeated as many times as necessary to deposit the desired thickness of rubber on the mandrel.

In accordance with the present invention, the liquid is projected against the cylindrical surface of a rotating member, preferably the inside of a rotating tubular mold, on which it is held by centrifugal force and adhesion or adhesion alone. In this operation vulcanization may be accomplished either by heating the mold or by the acid method, preferably the former.

In the accompanying drawings I have illustrated more or less diagrammatically, an apparatus by means of which the method of the invention may be practiced, the apparatus itself being also regarded as embodying certain features of the invention.

In the drawings:

Figure 1 is an elevation of the apparatus, the mold and jacket being shown in vertical section on the line of the axis of the same, the tank for the vulcanizable liquid being also shown in section;

Figure 2 is a section on line 2—2 of Figure 1.

Referring to the drawings by numerals, each of which is used to indicate the same or similar parts in the different figures, the machine as shown comprises a mold tube 1 which is preferably mounted to rotate about its axis in the manner to be described, and a nozzle 2, the nozzle being mounted within the tube mold and directed outwardly against the inner walls of the tube, means being further provided in accordance with the invention for moving one of said members 1—2, relatively to the other in the direction of the axis of the tube mold to provide for the distribution of the vulcanizable liquid uniformly over the entire inner surface of the tube mold or the portion thereof utilized. In the form of the invention shown the tube mold is supported in suitable bearings 3—4, and the tube is rotated about its axis in any suitable manner as by means of a motor 5 connected to the tube to operate the same by means of toothed gearing, 6—7, the gear 6 being mounted on the motor shaft and the gear 7 which meshes therewith being mounted on the tube 1. Any suitable means may be provided for heating. In the form of machine shown, the tube mold 1 is enclosed within a jacket 9 to which steam or hot water is supplied by way of a pipe 10, and to maintain the circulation and a uniform temperature, the heating fluid may be released or returned to the source of heat by way of a release or return pipe 11. In order to prevent loss of the heating fluid through the bearings, they may be suitably packed as indicated at 12, and the jacket, which as indicated supports the tube mold 1 is shown as supported in turn by a suitable frame 14.

In the form of the apparatus illustrated, the projecting nozzle 2 is supported on a pipe 15 which is substantially parallel to the axis of the tube mold 1 and projects within the mold, the tube mold and the jacket and the pipe 15 being broken away intermediately to indicate that they may be of indefinite length in accordance with the length of the tube which is to be manufactured. The pipe 15 is shown as supported by suitable clamping means 16 on a carriage or slide 17 which is in turn mounted on ways 18, also shown as of indefinite length and parallel to the axis of the tube 1. This carriage 17 is in accordance with the illustration given a reciprocating motion which is in turn imparted to the nozzle distributing the liquid throughout the length of the inside of the tube mold 1. This reciprocating motion as shown is accomplished by means of a chain 19 passed over sprockets 20 and 21 at each end of the ways. This chain carries a pin or follower 22 which projects through a vertical slot 24, or any suitable slot 24, in a depending arm 25 of the carriage 17, so that the motion of the chain as the sprockets 20 and 21 are rotated continuously in either direction, produces a rectilinear reciprocating motion of the carriage 17 on a path parallel to the axis of the tube mold 1, whereby the nozzle 2 and the pipe 15 are reciprocated within the tube mold 1 in the direction of the axis, the reciprocating motion being harmonically checked and accelerated at each end of the traverse of the carriage and the parts moved therewith.

In the form of the invention illustrated the chain is operated by an electric motor 27, the shaft of which carries a worm 29 which meshes with a toothed gear 30 mounted on a suitable shaft 31 which rotates in bearings 32. This shaft 31 carries a pinion 33 which meshes with a second pinion 34. This pinion is elongated in the direction of its axis and also meshes with a larger toothed gear 35 on a shaft 36, which shaft carries the sprocket 20, which drives the chain, imparting to the nozzle the reciprocating motion already described.

Vulcanizable liquid may be supplied to the nozzle 2 by way of the pipe 15, or otherwise, in any suitable manner. In the form of the invention shown, the end of the pipe 15 at 38 on the side of the carriage remote from the tube mold 1 is connected to a flexible hose 39 which is in turn connected to a low point of a tank 40 containing the vulcanizable liquid, the supply to the nozzle being preferably controlled by means of a valve 41. The liquid may be projected from the nozzle in any suitable manner.

In the form of the invention shown the liquid in the tank is placed under pressure, fluid pressure, which may be air, being supplied to the tank from any suitable source by way of a pipe 42 which may be controlled by a valve 43. The pressure in the tank may be further controlled or regulated by means of a relief outlet 44 controlled by a valve 45 or in any suitable manner.

In the practice of the method which is the subject of my invention, a supply of vulcanizable liquid which may be latex containing vulcanizing ingredients or other suitable liquid indicated by reference character 55, is placed in the tank and placed under pressure by supplying air pressure by way of a pipe 42. The tubular mold is preferably provided at each end with inwardly projecting ribs or shoulders 48, which prevent the escape of the liquid from the ends of the tubular mold. These shoulders may have a tapered or frusto-conical surface at 49 to give a corresponding inverse taper to the ends of the tubes which facilitates splicing.

In accordance with the preferred operation, steam or hot water is supplied to the jacket 9 by way of the pipe 10, and the tubular mold 1 is started in rotation by starting the motor which has been described as operating the same. The projecting nozzle 2 on the pipe 15 is given a reciprocating motion by the motor 27, the carriage 17 being moved on the ways 18 by the chain 19 which engages the slot 24 in the carriage by means of the pin 22.

The valve 41 being opened to permit the desired supply of the liquid to pass to the nozzle 2, the vulcanizable liquid is deposited uniformly on the inside of the tubular mold, the layer of vulcanized or vulcanizable compound being indicated by reference character 13. The rotation of the tubular mold and the reciprocating motion of the nozzle cause the liquid which is held by shoulders 48 at the ends to be uniformly distributed, and the liquid may be further held in position by the centrifugal force due to the rotation of the tube and is solidified by the vulcanizing action, which as previously pointed out, may be due to the heat of the jacket or may be accomplished in the case of an acid vulcanizing compound in a well known manner without the application of heat.

When the material is deposited to the desired thickness, the valve 41 is closed, cutting off the supply of liquid or it is otherwise discontinued, and the motion of the nozzle may be stopped, or the nozzle may be withdrawn, the vulcanizing process being continued until the tube is vulcanized to the desired degree, when the tube is removed by blowing.

In this connection, it should be understood that the apparatus described may be utilized either for the complete or for the partial vulcanization of the tube or for merely forming vulcanizable tube blanks which are completed by further vulcanization in any convenient manner, and further the manner of supplying liquid to the inside of the tubular mold is not necessarily limited to a single nozzle, the material being supplied in a preferred manner, the important feature being the uniform distribution of the liquid over the inside surface of the mold during solidification by rotation of the mold.

I have thus described specifically and in detail a method and apparatus embodying my invention in the preferred form in order that the nature and operation and the manner of applying the same may be clearly understood. However, the specific terms herein are used descriptively rather than in a limited sense, the scope of the invention being defined in the claims.

What I claim as new and desire to secure by Letters Patent is:

1. The method of making rubber tubing in definite uniform lengths adapted for use in the construction of inner tubes for pneumatic tires which consists in depositing vulcanizable liquid rubber composition on the inner surface of a tubular mold, and rotating the mold, whereby the liquid is held by centrifugal force in uniform distribution on the inner surface of the mold for a sufficient period to permit it to solidify.

2. The method of making rubber tubing in short lengths for use in the production of inner tubes for pneumatic tires which comprises projecting vulcanizable liquid rubber compound against the interior surface of a tubular mold, rotating the mold at a speed sufficient to hold the liquid by centrifugal force on the inner surface of the mold and distribute it uniformly thereupon and moving the point of projection in the direction of the axis of the mold.

3. The method of making rubber tubing in short lengths for use in the production of inner tubes for pneumatic tires which consists in projecting vulcanizable liquid rubber compound against the interior surface of a tubular mold, rotating the mold at a speed sufficient to hold the liquid by centrifugal force in close contact with the inside of the mold and to distribute it uniformly thereupon and moving the point of projection in the direction of the axis of the mold, the mold being heated to vulcanize the liquid.

4. An apparatus for use in the manufacture of rubber tubing in short lengths for use in the construction of inner tubes for pneumatic tires which consists of a tubular mold, means for rotating the mold at a speed sufficient to hold the material to be molded in contact with the mold by centrifugal force and to distribute it uniformly, means for directing a stream of liquid against the inner surface of the tube, means for changing the relation of the directing means to the tube in the direction of the length of the tube, means for supplying liquid material to the directing means, and means for projecting it therefrom and means at the ends of the mold to determine the length of the tube and its thickness by retaining the liquid up to a certain thickness and releasing the surplus.

5. An apparatus for making tubing in short lengths, each length adapted for use in the manufacture of an inner tube for pneumatic tires, which consists of a tubular mold, means for rotating the same, means for projecting the vulcanizable liquid against the inner wall of the mold throughout a considerable portion of the length of the mold, said means comprising a pipe entering the mold at the axial end thereof, the mold having a ring bearing support to provide for the admission of the pipe, and a jacket for heating fluid enclosing the mold.

6. An apparatus for making tubing in short lengths, each length adapted for use in the manufacture of an inner tube for pneumatic tires, which consists of a tubular mold, means for rotating the same, means for projecting the vulcanizable liquid against the inner wall of the mold throughout a considerable portion of the length of the mold, said means comprising a pipe entering the mold at the axial end thereof, the mold having a ring bearing support to provide for the admission of the pipe, and means at the end of the tube to support the liquid whereby the length and thickness of the tube are determined, the excess material being permitted to escape over said supporting means.

7. An apparatus for making tubing adapted for use in the manufacture of inner tubes for pneumatic tires, which consists of a tubular mold, means for rotating the same, means for projecting the vulcanizable liquid against the inner wall of the mold throughout a considerable portion of the length of the mold, and means at the end of the tube to support the liquid, said means having an inclined surface to impart a taper to the ends of the tube whereby splicing of the tubes in joining the ends to form the finished product is facilitated.

8. The method of making rubber tubing in definite predetermined lengths, the tubing being adapted for use in the construction of inner tubes for pneumatic tires, which consists in depositing vulcanizable liquid rubber compound on the inner surface of a tubular mold introducing the liquid by way of the axis of the mold, rotating the mold continuously during the introduction of the material, the speed of rotation being such as to hold the liquid by centrifugal force in uniform distribution on the inner surface of the mold for a sufficient period to permit it to solidify.

Signed by me at Baltimore, Maryland, this 23rd day of Oct., 1928.

EDWARD FETTER.